United States Patent
Na et al.

(10) Patent No.: US 11,232,376 B2
(45) Date of Patent: Jan. 25, 2022

(54) SYSTEM AND METHOD FOR OPTIMIZING COMBUSTION OF BOILER

(71) Applicant: DOOSAN HEAVY INDUSTRIES & CONSTRUCTION CO., LTD., Changwon-si (KR)

(72) Inventors: Sang Gun Na, Yongin-si (KR); Jwa Young Maeng, Yongin-si (KR); Hyun Sik Kim, Gimpo-si (KR); Jee Hun Park, Gwangmyeong-si (KR)

(73) Assignee: DOOSAN HEAVY INDUSTRIES & CONSTRUCTION CO., LTD., Gyeongsangnam-do (KR)

( * ) Notice: Subject to any disclaimer, the term of this patent is extended or adjusted under 35 U.S.C. 154(b) by 0 days.

(21) Appl. No.: 16/562,409

(22) Filed: Sep. 5, 2019

(65) Prior Publication Data

US 2020/0175435 A1 Jun. 4, 2020

(51) Int. Cl.
  *G06Q 10/04* (2012.01)
  *G05B 13/04* (2006.01)
  *G05B 17/02* (2006.01)

(52) U.S. Cl.
  CPC .......... *G06Q 10/04* (2013.01); *G05B 13/042* (2013.01); *G05B 13/048* (2013.01); *G05B 17/02* (2013.01)

(58) Field of Classification Search
  CPC ..... G05B 17/02; G05B 13/048; G05B 13/042
  See application file for complete search history.

(56) References Cited

U.S. PATENT DOCUMENTS 5,465,390 A * 11/1995 Cohen .................. H04W 16/18
                                                    455/423
5,740,033 A   4/1998 Wassick et al.
(Continued)

FOREIGN PATENT DOCUMENTS

CN          105444201 A  *  3/2016  ........... G05B 13/041
EP            1364163 B1      4/2008
(Continued)

OTHER PUBLICATIONS

Jung Hae Won, system for controlling optimized combustion on boiler, 2016, google patents, pp. 1-8 (Year: 2016).*
(Continued)

*Primary Examiner* — Rocio Del Mar Perez-Velez
*Assistant Examiner* — Yvonne Trang Follansbee
(74) *Attorney, Agent, or Firm* — Invenstone Patent, LLC

(57) ABSTRACT

A system for controlling a boiler apparatus in a power plant to combust under optimized conditions, and a method for optimizing combustion of the boiler apparatus using the same are provided. The boiler control system may include a task manager configured to collect information on a current operating state of a boiler and determine whether to perform a combustion optimization operation for the boiler, a pre-processor configured to preprocess data collected from the boiler and supply the pre-processed data, a modeler configured to create a boiler combustion model on the basis of the pre-processed data received from the pre-processor, an optimizer configured to receive the boiler combustion model from the modeler and perform the combustion optimization operation for the boiler using the boiler combustion model to calculate an optimum control value, wherein the pre-processed data is supplied to the modeler and the optimizer by the pre-processor, and an output controller configured to receive the optimum control value from the optimizer and
(Continued)

control an operation of the boiler by reflecting the optimum control value to a boiler control logic.

18 Claims, 7 Drawing Sheets

(56) References Cited

U.S. PATENT DOCUMENTS

| | | | | |
|---|---|---|---|---|
| 7,584,024 | B2 * | 9/2009 | Wroblewski | G05B 13/027 700/300 |
| 8,527,072 | B2 * | 9/2013 | Piche | H02J 3/38 700/36 |
| 8,755,916 | B2 | 6/2014 | Lou | |
| 2004/0044423 | A1 | 3/2004 | Wintrich et al. | |
| 2009/0132095 | A1 * | 5/2009 | Sekiai | G05B 13/027 700/286 |
| 2010/0049561 | A1 | 2/2010 | Lou et al. | |
| 2010/0319592 | A1 * | 12/2010 | Dohalick | F23K 3/02 110/186 |
| 2016/0091203 | A1 * | 3/2016 | Wang | F23N 1/022 700/274 |
| 2016/0109895 | A1 * | 4/2016 | Schindler | G05F 1/66 700/291 |
| 2020/0076196 | A1 * | 3/2020 | Lee | G05B 13/042 |

FOREIGN PATENT DOCUMENTS

| | | | | |
|---|---|---|---|---|
| EP | 1921280 | B1 * | 8/2019 | F01K 13/02 |
| JP | 2009198136 | A | 9/2009 | |
| JP | 2013178045 | A | 9/2013 | |
| JP | 2016205678 | A | 12/2016 | |
| KR | 100560114 | B1 | 3/2006 | |
| KR | 100576763 | B1 | 5/2006 | |
| KR | 101041467 | B1 | 6/2011 | |
| KR | 101484496 | B1 | 1/2015 | |
| KR | 20160104481 | A * | 9/2016 | |
| KR | 20160104481 | A | 9/2016 | |
| WO | WO-0073739 | A1 * | 12/2000 | G01S 11/16 |
| WO | WO-2019208773 | A1 * | 10/2019 | G05B 19/418 |
| WO | WO-2020105629 | A1 * | 5/2020 | F02C 6/00 |

OTHER PUBLICATIONS

Torset Odd, Measuring system inclduing positioning and data transfer, 2000, google patents, p. 13 (Year: 2000).*

Chen Yao, Combustion optimization method and system thereof, 2016, google patents, pp. 1-6 (Year: 2016).*

Widmer neil colin, systems and methods for multi-level optimizing control systems for boilers, 2013, pp. 1-11 (Year: 2013).*

Jun, Pulverized coal drying system for coal pulverizer and pulverized coal drying method therefor, and pulverized coal drying program, coal pulverizer, and gasification combined cycle facility, 2020, google patents, translation of WO2020105629A1 (Year: 2020).*

Yoshida, Operation assistance device for plant, operation assistance method for plant, learning model creation method for plant, operation assistance program for plant . . . , 2019, google patents, translation of WO2019208773A1 (Year: 2019).*

* cited by examiner

SYSTEM AND METHOD FOR OPTIMIZING COMBUSTION OF BOILER

CROSS REFERENCE TO RELATED APPLICATION

This application claims priority to Korean Patent Application No. 10-2018-0152752, filed on Nov. 30, 2018, the entire disclosure of which is incorporated herein by reference in its entirety.

BACKGROUND

1. Field

Apparatuses and methods consistent with exemplary embodiments relate to a system for controlling a boiler apparatus in a power plant to ensure combust under optimized conditions, and a method for optimizing combustion of the boiler apparatus using the same.

2. Description of the Related Art

A thermal power plant has a boiler therein to heat water by using an exothermic reaction generated when burning fuel such as coal or the like, thereby producing steam for driving a turbine. When a combustion occurs in the boiler, emissions such as nitrogen oxides and carbon dioxide are generated. In recent years, the combustion environment is controlled to generate less emission because an operation of the power plant requires considerable cost to manage such emissions, and efforts are being made to increase the combustion efficiency of boilers.

In a related art thermal power plant, a boiler control, that is, a combustion control, has been performed by a skilled expert by adjusting combustion environment parameters of a boiler with reference to performance test data during a trial run, and then starting a boiler operation. In addition, after the boiler operation has been started, the combustion control is performed by fine-tuning an offset value. Therefore, according to the related art boiler operating method, because it is not easy to control the boiler in an optimum combustion state when the boiler is operating, stable combustion control for the stability of the boiler has been given more priority than the optimum control thereof. There has been a problem in the related art that the optimum combustion environment of a boiler could not be properly implemented.

In order to solve the problem, studies have been made to optimize combustion control of a boiler by automatically acquiring and analyzing operating data of the boiler in real time and automatically adjusting various control variables of the boiler according to the analyzed result.

SUMMARY

Aspects of one or more exemplary embodiments provide a system and method for controlling a boiler in a power plant to maximize the combustion efficiency of the boiler while minimizing the generation of emissions including nitrogen oxides and carbon oxides.

Aspects of one or more exemplary embodiments provide a method for controlling the combustion environment of a boiler in a power plant by applying an artificial intelligence algorithm for boiler combustion control so that a most suitable model for boiler combustion is generated through self-learning and modeling and the combustion environment is controlled with reference to the generated model.

Aspects of one or more exemplary embodiments provide a suitable operation method for real-time boiler control by reducing the time required for calculating optimum control values for each of a great number of control targets of a boiler in a power plant while dividing the control targets into a predetermined number of groups.

Additional aspects will be set forth in part in the description which follows and, in part, will become apparent from the description, or may be learned by practice of the exemplary embodiments.

According to an aspect of an exemplary embodiment, there is provided a boiler control system including: a task manager configured to collect information on a current operating state of a boiler and determine whether to perform a combustion optimization operation for the boiler; a pre-processor configured to preprocess data collected from the boiler and supply the preprocessed data; a modeler configured to create a boiler combustion model on the basis of the pre-processed data received from the pre-processor; an optimizer configured to receive the boiler combustion model from the modeler and perform the combustion optimization operation for the boiler using the boiler combustion model to calculate an optimum control value, wherein the pre-processed data is supplied to the modeler and the optimizer by the pre-processor; and an output controller configured to receive the optimum control value from the optimizer and control an operation of the boiler by reflecting the optimum control value to a boiler control logic.

The optimizer may calculate the optimum control value by applying the pre-processed data received from the pre-processor to the boiler combustion model, repeatedly simulating the boiler combustion model, and applying the simulated result to a combustion optimization algorithm.

The combustion optimization algorithm may be one of a Proportional-Integral-Derivative (PID) algorithm, a Degree of Freedom (DOF) algorithm, a Model Predictive Control (MPC) algorithm, an Adaptive algorithm, a Fuzzy algorithm, an H-infinity algorithm, a Linear Parameter Varying (LPV) Model-based algorithm, and a Genetic Algorithm (GA).

The optimizer may calculate optimum control values for a plurality of control objects in the boiler such that the control objects are divided into groups, each including a specified number of control objects, and the optimum control values are calculated for each group.

The control objects may be divided into groups on the basis of a large scale range, a medium scale range, and a small scale range, and the optimum control values may be calculated for the control objects.

The optimizer may apply the combustion optimization algorithm depending on a purpose received from a user.

The optimizer may receive the purpose selected from the user, the purpose including a cost optimization considering a cost as a top priority, an emission optimization considering an emission reduction as a top priority, and an equipment protection optimization considering an equipment protection as a top priority.

Before performing the combustion optimization operation for the boiler, the optimizer may select two or more algorithms capable of performing the combustion optimization operation from a plurality of algorithms, and select one of the selected algorithms as a combustion optimization algorithm for performing the combustion optimization operation.

The optimizer may perform a performance simulation on the selected algorithms, and select an algorithm having the highest efficiency as a result of the performance simulation as the combustion optimization algorithm.

According to an aspect of another exemplary embodiment, there is provided a method of controlling a boiler, the method including: collecting information on a current operating state of the boiler and determining whether to perform a combustion optimization operation for the boiler; pre-processing data collected from the boiler; creating a boiler combustion model on the basis of the pre-processed data; performing the combustion optimization operation using the boiler combustion model to calculate an optimum control value; and controlling an operation of the boiler by reflecting the optimum control value to a boiler control logic.

The calculating the optimum control value may include applying the pre-processed data received from a pre-processor to the boiler combustion model, repeatedly simulating the boiler combustion model, and applying the simulated result to a combustion optimization algorithm.

The combustion optimization algorithm may be one of a Proportional-Integral-Derivative (PID) algorithm, a Degree of Freedom (DOF) algorithm, a Model Predictive Control (MPC) algorithm, an Adaptive algorithm, a Fuzzy algorithm, an H-infinity algorithm, a Linear Parameter Varying (LPV) Model-based algorithm, and a Genetic Algorithm (GA).

The calculating the optimum control value may include calculating the optimum control values for a plurality of control objects in the boiler such that the control objects are divided into groups, each including a specified number of control objects, and the optimum control values are calculated for each group.

In the calculating the optimum control values, the control objects may be divided into groups on the basis of a large scale range, a medium scale range, and a small scale range, and the optimum control values may be calculated for the control objects.

The calculating the optimum control values may include receiving an optimization purpose from a user, and applying a combustion optimization algorithm depending on the received optimization purpose.

The optimization purpose may include a cost optimization considering a cost as a top priority, an emission optimization considering an emission reduction as a top priority, and an equipment protection optimization considering an equipment protection as a top priority.

The method may further include, before performing the combustion optimization operation for the boiler, selecting two or more algorithms capable of performing the combustion optimization operation from a plurality of algorithms, and selecting one of the selected algorithms as a combustion optimization algorithm for performing the combustion optimization operation.

The selecting the combustion optimization algorithm may include performing a performance simulation on the selected algorithms, and selecting an algorithm having the highest efficiency as a result of the performance simulation as the combustion optimization algorithm.

According to an aspect of another exemplary embodiment, there is provided a non-transitory computer-readable storage medium storing instructions of executing a method of controlling a boiler, the method including: collecting information on a current operating state of the boiler and determining whether to perform a combustion optimization operation for the boiler; pre-processing data collected from the boiler; creating a boiler combustion model on the basis of the pre-processed data; performing the combustion optimization operation using the boiler combustion model to calculate an optimum control value; and controlling an operation of the boiler by reflecting the optimum control value to a boiler control logic.

According to one or more exemplary embodiments, the combustion efficiency of the boiler in a power plant can be improved and the emissions causing environmental pollution can also be minimized, whereby the cost of treating the emissions can be significantly reduced, thereby significantly reducing the operating cost of the power plant.

In addition, one or more exemplary embodiments can control the boiler in an optimized combustion state with reference to the results learned by artificial intelligence, so that even unskilled workers can realize, without difficulty, a better combustion environment compared to what is obtained by a skilled expert in the related art.

Further, one or more exemplary embodiment can perform an optimization operation on a great number of control targets of an object such as a boiler while dividing the control targets into groups, parts, and units, thereby reducing the operation time and thus controlling the boiler closer to real time over a shorter period of time.

BRIEF DESCRIPTION OF THE DRAWINGS

The above and other aspects will be more apparent from the following description of the exemplary embodiments with reference to the accompanying drawings, in which.

DETAILED DESCRIPTION

Figure 1:
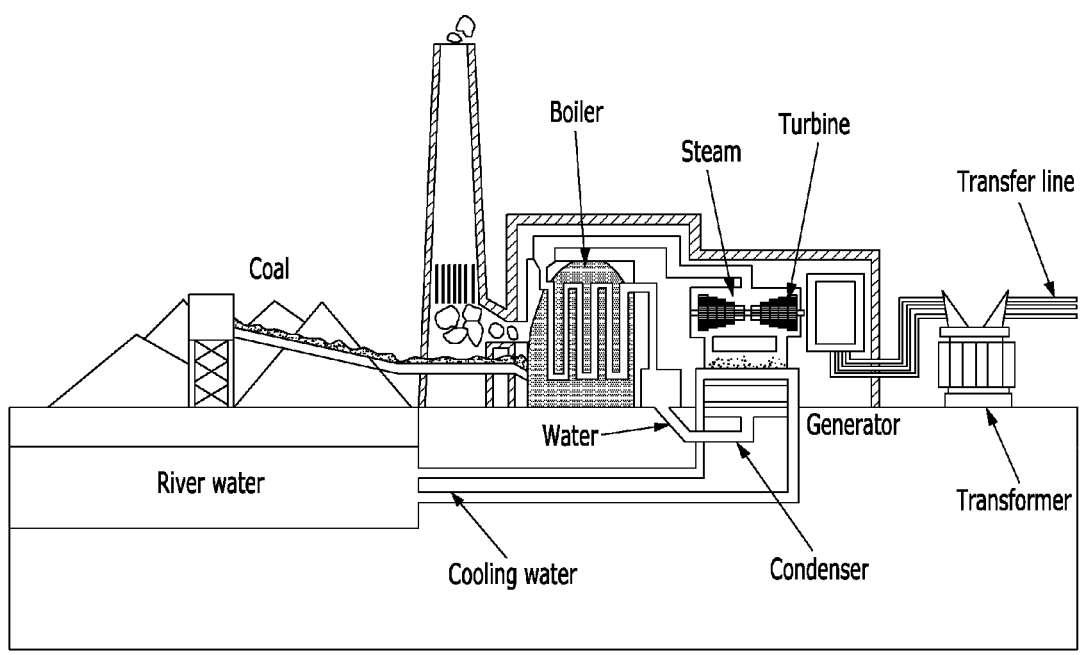
FIG. 1 is a schematic diagram illustrating a general configuration of a thermal power plant.

Various modifications may be made to the embodiments of the disclosure, and there may be various types of embodiments. Thus, specific embodiments will be illustrated in drawings, and embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

Unless otherwise defined, the terms including technical and scientific terms used herein have the same meaning as would be generally understood by those skilled in the relevant art. However, these terms may vary depending on the intentions of the person skilled in the art, legal or technical interpretation, and the emergence of new technologies. In addition, some terms are arbitrarily selected by the applicant. These terms may be construed per the meaning defined or described herein and, unless otherwise specified, may be construed on the basis of the entire contents of this specification and common technical knowledge in the art.

The functional blocks illustrated in the drawings and described below are only examples of possible implementations. Other functional blocks may be used in other implementations without departing from the spirit and scope of the detailed description. Also, while one or more functional blocks of the present disclosure are represented by separate blocks, one or more of the functional blocks may be a combination of various hardware and software configurations that perform the same function.

Also, "a module" or "a part" in the disclosure perform at least one function or operation, and these elements may be implemented as hardware or software, or as a combination of hardware and software. Further, a plurality of "modules" or "parts" may be integrated into at least one module and implemented as at least one processor, except "modules" or "parts" that need to be implemented as specific hardware.

The terminology used herein is for the purpose of describing particular embodiments only and is not intended to limit the scope of the disclosure. As used herein, the singular forms "a", "an", and "the" are intended to include the plural forms as well unless the context clearly indicates otherwise. Further, the terms "comprises", "includes", or "have/has" should be construed as designating that there are such features, regions, integers, steps, operations, elements, components, and/or a combination thereof in the specification, not to exclude the presence or possibility of adding one or more of other features, regions, integers, steps, operations, elements, components and/or combinations thereof.

In addition, terms concerning attachments, coupling and the like, such as "connected" and "coupled" refer to a relationship in which structures are secured or attached to one another either directly or indirectly through intervening structures.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinafter, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

FIG. 1 illustrates a general configuration of a thermal power plant, in particular for illustrating a position and role of a boiler. Thermal power plants generate steam from coal or petroleum-fired power to turn steam turbines and produce electrical energy. Boiler in the thermal power plant serves to boil water by burning fuel to supply high-temperature and high-pressure steam to steam turbines. The boiler may include a boiler body containing water and steam, a combustor for combusting a fuel, and a furnace. The combustor, the furnace, and the like are controlled by a control system to control temperature, pressure, and the like.

Boiler control is a key control operation in the power plant. In the past, because the control operation of the boiler has been a very complicated process, a skilled expert is necessary for normal operation. Recently, by adopting an automated control method in operating the boiler, a system for boiler control is implemented without manual manipulation. This automated control method enables real-time control of the boiler. Further, in order to increase the combustion efficiency of the boiler, a control that is gradually close to real time by controlling the boiler such that a current state of the boiler is checked in every short period of time may be implemented, and respective control operations may be performed on control targets according to the current state.

The exemplary embodiment provides a boiler control system and method that can improve the combustion efficiency and reduce emission by adding, to a currently available boiler control system and method, (i) generation and update of a boiler combustion model utilizing artificial intelligence, and (ii) an optimization operation for finding an optimal set point for each control target with reference to the status of a boiler in operation.

Figure 2:
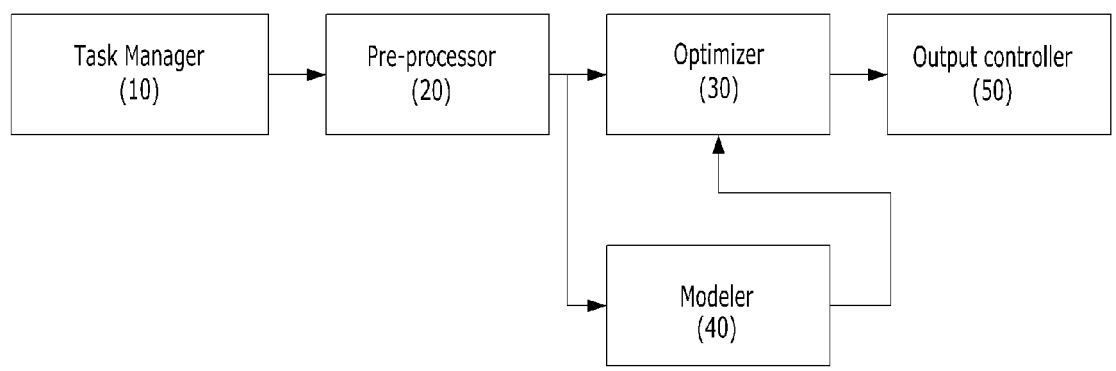
FIG. 2 is a block diagram illustrating a configuration of a boiler control system according to an exemplary embodiment.

FIG. 2 illustrates a block diagram of a boiler control system according to an exemplary embodiment. Referring to FIG. 2, the boiler control system includes a task manager 10, a pre-processor 20, an optimizer 30, a modeler 40, and an output controller 50. Although the boiler control system of FIG. 2 includes configuration blocks designated by functions or steps to be performed, it will be appreciated that the boiler control system may be implemented as a device, including a CPU for operation and a memory that can store program and data for operation, and that the above configurations of the boiler control system may be implemented on a program designed in a computer-readable language, and executed by the CPU. Further, the boiler control system may be implemented by hardware or firmware, software, or a combination thereof. When implemented using hardware, the boiler control system may include an application specific integrated circuit (ASIC), or a digital signal processor (DSP), a digital signal processing device (DSPD), a programmable logic device (PLD), a field programmable gate array (FPGA), and the like. When implemented using firmware or software, the boiler control system may include a module, procedure, or function that performs the above functions or operations.

The task manager 10 is configured to check a current operating state of the boiler and determine whether to perform a boiler combustion optimization. For example, the task manager 10 may collect operation data and state data (e.g., state binary value) of the boiler that is in operation, and determine whether the boiler combustion optimization is possible (i.e., whether to perform the boiler combustion optimization) based on the collected data. The operation data of the boiler includes measurements received from various sensors installed in the currently operating boiler, or control values that can be monitored by the boiler control system. Examples of the operation data may include power output (MW), commands, and the like. The state data includes values that indicate fluctuations in boiler output, fuel fluctuations, temperature and pressure in each component, and so on.

The task manager 10 determines whether combustion optimization is necessary or possible based on the collected operation data and state data. In this determination process, integrity of the boiler system (e.g., the operating state of the hardware, the system resource status, communication environment, etc.), and integrity of respective modules in the boiler system (e.g., the operating state of software, the existence of the boiler combustion model, etc.) are considered. For example, the task manager 10 may determine that the power plant is not stabilized in a section in which the power output changes drastically. For example, when the power output (e.g., 500 MW) changes tens of megawatts (e.g., 50 MW) over a reference value for 30 minutes, the task manager 10 may determine that it is an unstable state and may not proceed with the combustion optimization.

There are three analysis methods to determine whether the combustion optimization is necessary or possible. The analysis methods include an analysis method based on boiler operation data, an analysis method based on a state binary value, and an analysis method based on previously recorded and stored expert's knowledge and experience. These analysis methods may be used unitarily or in combination by the task manager 10 to determine whether to perform the combustion optimization. The analysis method based on the expert's knowledge and experience, which are recorded and stored in advance, is configured such that the analysis is performed based on previously stored data including operating states of a boiler and corresponding manipulations by an expert who operates the boiler. For example, expert's manipulation such as a supply B of fuel to a combustion chamber of a boiler if the temperature in the combustion chamber is A, and expert's manipulation such as an adjustment of a damper angle to D if the temperature in the combustion chamber is C may be stored and will be referred to later for analysis.

The pre-processor 20 is configured to pre-filter only data suitable for modeling, that is, data suitable for learning by the modeler 40. While a quantity of input data that can be collected from the boiler and output data according to the input data is very greater, some data include some error values that are unmatched or less correlated, which reduces the accuracy of modeling. The pre-processor 20 may be a configuration required to further improve the accuracy when generating a model in the modeler 40 by filtering such unnecessary data in advance.

The pre-processor 20 performs signal restoration, filtering, and outlier processing functions. The signal restoration function is configured to restore signals collected from the boiler when there is some loss in the signals, or to restore the corresponding signal when the boiler has an abnormality or failure. The filtering function is configured to filter out, among the restored signals, data outside a normal data range or remove signal noise, and to further extract only data to be used for modeling, optimization operation, and output control, using a known knowledge-based logic. The outlier processing function is configured to process out-of-trend data using a data-based logic.

The pre-processor 20 may be implemented to further perform a tag clustering function and a data sampling function according to a designer's intention or a user's need. Here, the tag clustering function serves to construct one data group by deleting unnecessary tag information and extracting only relevant tag information, among tags corresponding to respective control targets of a boiler. The data sampling function serves to operate data patterns and sample data according to a sampling algorithm to output learning data required for modeling.

As described above, the pre-processor 20 serves to collect data associated with the operation of the boiler and process the data into a form suitable for future modeling.

The optimizer 30 is a configuration that calculates an input for creating an optimum combustion state using a boiler combustion model that is to be generated by the modeler 40. The optimizer 30 performs a function of receiving a purpose selection from a user, a function of receiving a boiler combustion model from the modeler 40, and a function of performing a boiler combustion optimization using the boiler combustion model.

The function of receiving the purpose selection from the user, i.e. an operator of the boiler control system, can first select a purpose to carry out the combustion optimization prior to executing the combustion optimization. The optimizer 30 may receive the user's selection by providing an interface to select a plurality of purposes. The plurality of purposes may include, for example, a cost optimization considering cost as a top priority, an emission optimization considering emission reduction as a top priority, and an equipment protection optimization considering equipment protection as a top priority. It is understood that this is merely one example, and other purposes for optimization may be included. The optimizer 30 performs an optimization operation by applying different logics according to the user's selection of purposes received from the user.

Regarding the function of receiving the boiler combustion model from the modeler 40, the optimizer 30 requires a boiler combustion model to perform the optimization operation, in which the boiler combustion model may be composed of a combination of mathematical models including an artificial neural network, which may be generated through repeated learning by the modeler 40.

Regarding the function of performing the boiler combustion optimization operation, the optimizer 30 calculates an optimal input value as a final output value by executing a simulation with application of the user's purpose selection and the boiler combustion model. The algorithms or controllers used in this case may include Proportional-Integral-Derivative (PID) algorithms, Degree of Freedom (DOF) algorithms, Model Predictive Control (MPC) algorithms, Adaptive algorithms, Fuzzy algorithms, H-infinity algorithms, Linear Parameter Varying (LPV) Model-based algorithms, Particle Swarm Optimization algorithms, Genetic Algorithm (GA), etc.

The optimizer 30 performs an optimization operation according to the user's purpose selection and the boiler combustion model received from the modeler 40 to calculate the optimal input value required for boiler combustion control.

The modeler 40 generates a boiler combustion model that can be utilized in the optimizer 30. According to the exemplary embodiment, it is characterized in that the modeler 40 generates the boiler combustion model using an artificial neural network.

The artificial neural network is a data processing methodology that simulates an inductive learning ability by mathematically modeling an information processing structure of a brain composed of neurons. This data processing methodology has a main purpose of patterning correlation between input and output values, and predicting an output value from a new input value based on the derived pattern. The artificial neural network consists of parallel connection structures (layers) of nodes that play the role of neurons. Generally, the neural network has a serial connection of input layer-hidden layer-output layer. Alternatively, the neural network may be implemented to have a plurality of hidden layers to process the complicated correlation between input and output values. When using the artificial neural network, even if physical characteristics or correlation are not clearly known, it is possible to obtain learning of correlation only with input and output values, prediction of multiple outputs, and deriving of the correlation between input and output values without linear extrapolation for non-linear behavior.

The modeler 40 may receive an input value and an output value related to boiler combustion from the pre-processor 20. Examples of the input data may include damper angles of a primary air and a secondary air, a damper angle of a combustion air nozzle (OFA), an amount of coal fed from a coal feeder, an ambient temperature, etc. Examples of the output data may include a boiler output, temperature and pressure of a combustion gas in the boiler, an amount of nitrogen oxides, carbon monoxide, and oxygen in the combustion gas, a spray flow rate of a reheater, and the like.

The modeler 40 generates a boiler combustion model similar to the actual operating state of the boiler by using an artificial neural network, and the generated boiler combustion model is provided to the optimizer 30.

The output controller 50 is configured to perform the combustion control of the boiler. The output controller 50 includes a function of checking a current operating state of the boiler prior to controlling the boiler, and a function of reflecting the optimum control value calculated by the optimizer 30 by applying the optimum control value to the existing boiler control logic.

Regarding the function of checking the operating state of the boiler, the output controller 50 needs to check the current operating state of the boiler prior to actually controlling the boiler. This is because even if the optimum control value calculated by the optimizer 30 is immediately reflected in the boiler operating state, the boiler may be in an unstable state or an error may occur, so the optimum control value should be appropriately divided and reflected according to the current operating state of the boiler.

The output controller 50 may maximize actual combustion efficiency of the boiler by inputting the optimum control value previously calculated by the optimizer 30 to the boiler that is in operation. Here, the output controller 50 performs Dynamic Bias Tracking on the calculated optimum control value, thereby reflecting the optimum control value in real time to the existing combustion logic of the boiler. For example, assuming that the optimum control value is a temperature value T100 in a combustion chamber of the boiler, if the current temperature in the combustion chamber is T1, the output controller 50 should perform a control operation to elevate the temperature from T1 to T100. Here, a sudden change in temperature may cause problems, so the temperature should be controlled in stages. In this case, the output controller 50 may change the temperature in stages while dividing a temperature range (to T100) to be changed into a plurality of continuous stage sub-ranges. For example, the output controller 50 may control the temperature to gradually elevate from T1 to T20 in a first stage time period, from T20 to T40 in a second stage time period, from T40 to T60 in a third stage time period, from T60 to T80 in a fourth stage time period, and from T80 to T100 in a final fifth stage time period. This time period is shorter than a time period in which the optimum control value is calculated by the optimizer 30. For example, assuming that the optimizer 30 calculates the optimum control value every 5 minutes, the output controller 50 may execute an operation control of the boiler every 10 seconds. That is, performing the operation control of the boiler in every short time periods is defined as dynamic bias tracking, which is provided for checking the operating state of the boiler in real time and at the same time, stably reflecting the optimum control value without a sudden change in the operation of the boiler.

Figure 3:
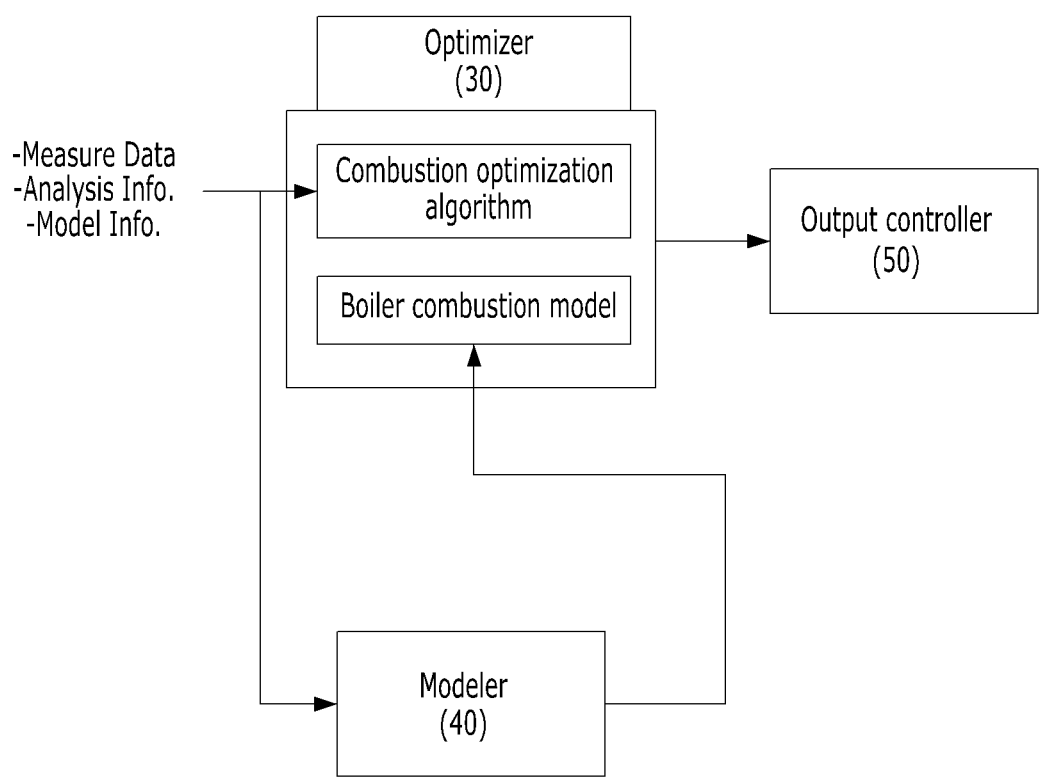
FIG. 3 is a view illustrating a function of an optimizer in the boiler control system according to an exemplary embodiment.

FIG. 3 illustrates a function of the optimizer 30 in the boiler control system according to an exemplary embodiment. Referring to FIG. 3, the optimizer 30 obtains an optimum control value through a boiler combustion model and a combustion optimization algorithm. It is understood that the combustion optimization algorithm may be a set of procedures, methods and instructions for combustion optimization, and may be replaced by another term, such as combustion optimization technology, combustion optimization control, or the like.

Here, the boiler combustion model is generated by the modeler 40 based on the results learned through the artificial neural network.

Although the combustion optimization algorithm may have various kinds of algorithms, it may be a control using a particle swarm optimization technology in other exemplary embodiment. Particle swarm optimization techniques are classified as Swarm Intelligence Techniques, which are stochastic global optimization techniques that are developed through inspiration from the social behavior of animals such as fishes or birds. The particle swarm optimization algorithm copies the way for a large number of entities, called particles, to find an optimum solution within a given search area on the basis of information of each particle and of a group of particles as a whole. The particle swarm optimization algorithm is easy to implement because it can perform a search only by four arithmetic operations, compared to other heuristic optimization techniques. Especially, it is easy to analyze natural phenomenon that cannot be differentiated, because it does not use gradient information. However, it will be appreciated that the combustion optimization algorithm is not limited to the particle swarm optimization algorithm, and any one of various algorithms for implementing combustion optimization may be selected.

It is understood that the optimizer 30 inputs a plurality of control variables to a single boiler combustion model, and repeatedly performs a process of converging the control variables as a single particle to an optimum control value using the particle swarm optimization algorithm or other algorithm that is selected.

Figure 4:
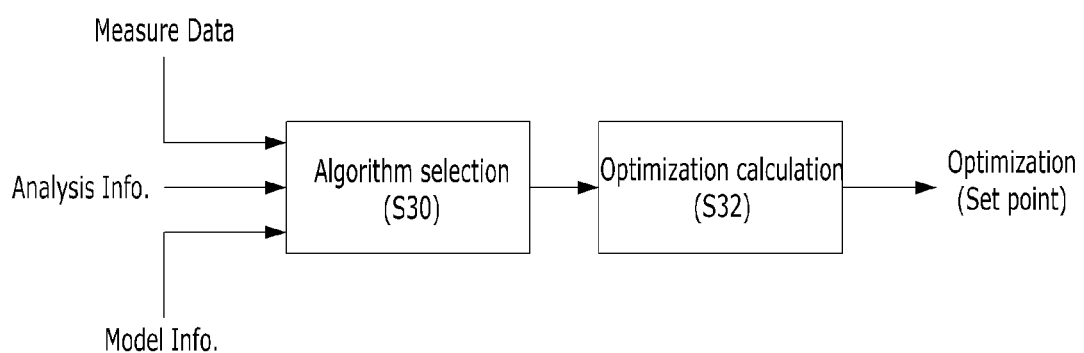
FIG. 4 is a block diagram illustrating operations performed by the optimizer according to an exemplary embodiment.

FIG. 4 illustrates operations performed by the optimizer 30 according to an exemplary embodiment. Referring to FIG. 4, the operations performed by the optimizer 30 includes an algorithm selection operation S30 of selecting an algorithm and an optimization calculation operation S32 of calculating an optimum control value according to the selected algorithm.

In the algorithm selection operation S30, the optimizer 30 selects an algorithm or a controller that is most effective for optimization. In this case, the optimizer 30 may receive data required for selecting the algorithm, for example, measured data from sensors installed in the boiler or other components of the boiler control system. The measured data may include measurements for a boiler that is in operation and measurements of the previous operating state of the boiler that was stored. In addition, the optimizer 30 may receive analysis information from other components of the boiler control system or other configuration outside the boiler control system. Here, the analysis information may include information about a pattern, power generation output, power generation efficiency, and an operating state of analyzed data. In addition, the algorithm selection operation S30 may also receive information about the boiler combustion model from the modeler 40.

Figure 5:
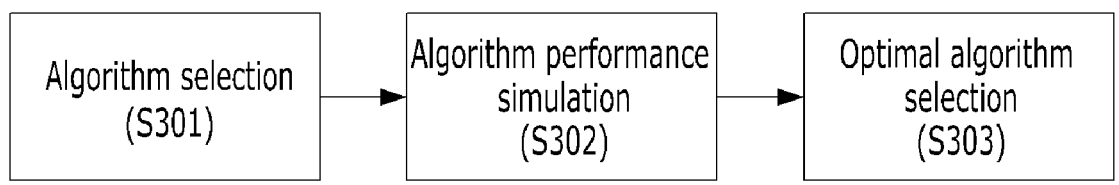
FIG. 5 is a block diagram illustrating operations performed by the optimizer of FIG. 4 in further detail.

FIG. 5 illustrates the algorithm selection operation S30 performed by the optimizer 30 in further detail. Referring to FIG. 5, the algorithm selection operation S30 may include an algorithm selection operation S301, an algorithm performance simulation operation S302, and an optimal algorithm selection operation S303.

The optimizer 30 selects at least two algorithms determined to be suitable for boiler combustion optimization in the algorithm selection operation S301. The algorithms or controllers for optimizing boiler combustion may include a variety of algorithms or controllers, such as PID controllers, DOF controllers, MPC, Adaptive controllers, Fuzzy controllers, H-infinity controllers, LPV model-based controllers, etc. In addition, Genetic Algorithm (GA)-based controllers, such as Distributed GA (DGA), Interactive GA (iGA), Gas for Multi-Objective Optimization (MOGA), Genetic Programming, Particle Swarm Optimization (PSO), etc. may be further included. The optimizer 30, among various algorithms or controllers, selects at least two algorithms that are most suitable for calculating boiler combustion optimization by referring to at least one of measured values, analysis information, and model information. At this time, the criterion of the selection may be set in various ways. For example, the criterion of selection may depend on which object in the boiler is to be controlled, what part the measured value is for, what amount of combustion is changed within a predefined time, which boiler combustion model the modeling unit 40 receives, or the like.

After two or more algorithms are selected in operation S301, the optimizer 30 performs the performance simulation for the selected algorithms in operation S302, and selects an algorithm showing the highest efficiency as a result of the performance simulation as an optimal algorithm, that is, an algorithm or controller for the optimization operation in operation S303.

For example, the optimizer 30 may select the PID controller and the PSO as a controller for optimization. Then, by performing a performance simulation for each controller, the optimizer 30 may determine which controller is most suitable for finding the boiler combustion optimization value. Finally, the optimizer 30 may select the suitable controller according to the result.

The optimization calculation operation S32 performed after the algorithm selection operation S30 is an operation of calculating a value for optimizing the boiler combustion on the premise that the algorithm for the optimization operation is determined. It is assumed that PSO is selected as the algorithm for the optimization operation.

Figure 6:
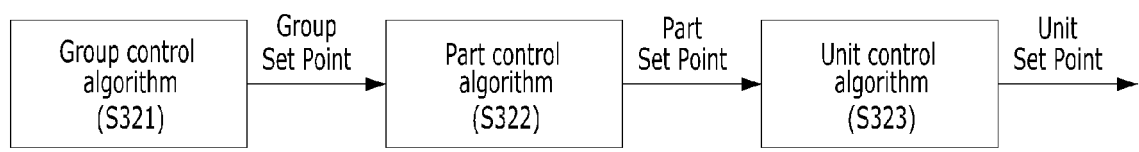
FIG. 6 is a block diagram illustrating an optimization operation performed by the optimizer of FIG. 4 in further detail.

FIG. 6 illustrates the optimization calculation operation S32 performed by the optimizer 30 in further detail. Referring to FIG. 6, the optimization calculation operation S32 includes operation S321 of applying a group control algorithm, operation S302 of applying a part control algorithm, and operation S303 of applying a unit control algorithm. Each algorithm illustrated in FIG. 6 is proposed to solve a problem that it is difficult to perform optimization operations for individual objects when there are many objects to be controlled in a single boiler. For example, assuming that there are 100 control objects in a boiler, it is impossible to control the operation of the boiler in real time because it takes so much time to calculate optimum control values, i.e., set points, individually. Thus, the respective algorithms of FIG. 6 are proposed to solve this problem. For example, if a control cycle for controlling the operation of a boiler is 5 minutes, but the calculation is not completed within this control cycle, because an optimum control value for controlling the boiler is practically unknown in the next control cycle, it is impossible to achieve the maximization of combustion efficiency and the minimization of emissions. To solve this problem, the control objects are divided into groups (i.e., large scale), parts (i.e., medium scale), and units (i.e., small scale), and the operation is performed for each scale.

Figure 7:
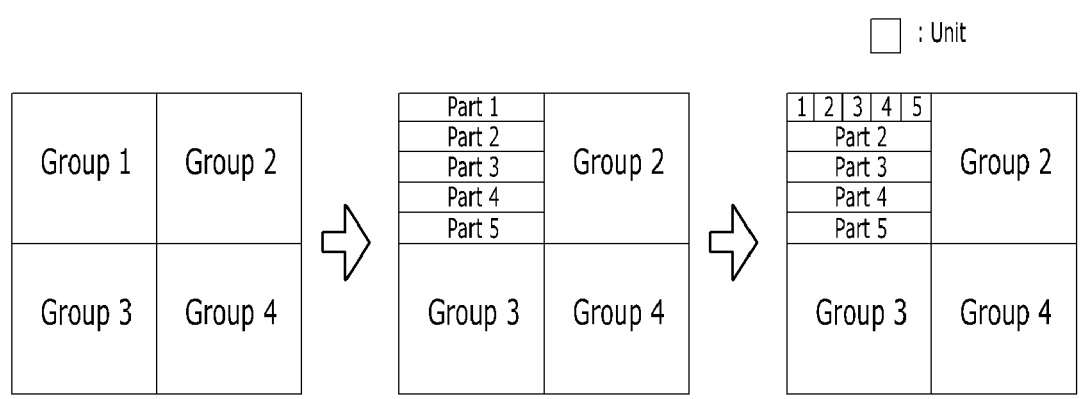
FIG. 7 is a schematic diagram illustrating an optimization operation according to an exemplary embodiment.

FIG. 7 illustrates an optimization operation according to an exemplary embodiment. In other words, FIG. 7 illustrates the optimization operation process of FIG. 6 in an easy-to-understand manner. For example, a plurality of control objects are divided into four groups so that optimum control values are calculated for the four groups, each of the four groups is divided into five parts so that optimum control values are calculated for a total of 20 parts, and each of the 20 parts is divided into five units so that optimum control values are calculated for a total of 100 units. The control objects may include, for example, dampers installed in a boiler. In order to improve the combustion efficiency of a boiler, the dampers installed in the boiler should be individually controlled. However, it is not easy to calculate an optimum set point for each damper due to a sudden increase in the amount of calculation and a resultant heavy load applied to a controller. The optimization operation process of FIGS. 6 and 7 improves the efficiency of operation to individually control a plurality of control objects installed in a boiler. The control objects having similar conditions or environments are classified into a group, which is analyzed in sequence to fine optimum control values for corresponding control objects according to its scale range. For example, in a case in which a plurality of dampers are distributed in the first to fourth areas of the boiler, an operation may be performed such that a first operation is performed on all the dampers provided in the first to fourth areas, a second operation is performed on the dampers for each area on the basis of a value calculated by the first operation, and a third operation is performed on individual dampers in the first to fourth areas, respectively, based on a value calculated by the second operation. Here, the value calculated by the first operation may be an average value for all dampers, and the value calculated by the second operation may be an average value for the dampers provided in each area. The resulting values calculated for grouped and classified control objects are sequentially used as the reference values when the next operation is performed for more specified scale range.

As described above, when performing operations on the plurality of control objects while dividing them into specified ranges, e.g., a large scale range, a medium scale range, and a small scale range, the control objects may be subjected to a quick operation. In a system in which control objects thereof should be controlled repeatedly within a short control cycle, such an operation method is necessary.

While exemplary embodiments have been described with reference to the accompanying drawings, it will be apparent to those skilled in the art that various modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. A system for controlling an operation of a boiler having a plurality of areas, the system comprising a central processing unit (CPU) including memory, the CPU configured to execute program steps of:
   collecting information on a current operating state of the boiler to determine whether to perform a combustion optimization operation for the boiler;
   pre-processing data collected from the boiler;
   creating a boiler combustion model based on the pre-processed data;
   performing the combustion optimization operation using the boiler combustion model and the pre-processed data to calculate an optimum control value for a first time period; and
   controlling a plurality of control objects of the boiler by reflecting the optimum control value to a boiler control logic, the plurality of control objects including control of an amount of coal that is fed from a coal feeder to a combustion chamber of the boiler and an adjustment of a damper angle of each of a plurality of dampers installed in the boiler,
   wherein each of the plurality of control objects of the boiler is controlled by:
      dividing a control range of a corresponding control object of the plurality of control objects of the boiler into a plurality of continuous stage sub-ranges;
      checking a current operating state of the corresponding control object prior to the controlling of the executed program steps; and
      reflecting the optimum control value in the boiler control logic existing for the current operating state,
   wherein the corresponding control object is controlled for each stage of the plurality of continuous stage sub-ranges and is controlled during each of a plurality of second time periods respectively corresponding to the plurality of continuous stage sub-ranges, each of the plurality of second time periods being shorter than the first time period,
   wherein the plurality of dampers includes a group of dampers installed in each area of the plurality of areas of the boiler, each of the groups of dampers including a plurality of parts of damper groups, each of the plurality of parts of damper groups including at least one unit of dampers, each of the at least one unit of dampers comprising a damper that is separate from all other dampers,
   wherein the optimum control value is calculated for each damper of the plurality of dampers such that the combustion optimization operation includes a plurality of operations,
   wherein the combustion optimization operation is performed by a first operation of the plurality of operations, a second operation of the plurality of operations, and a third operation of the plurality of operations,
   wherein the first operation of the plurality of operations is performed over a large scale range on each damper of the plurality of dampers,
   wherein the second operation of the plurality of operations is performed over a medium scale range on the dampers for each area on the basis of a value calculated by the first operation, the medium scale range being a smaller scale range than the large scale range, and
   wherein the third operation of the plurality of operations is performed over a small scale range on individual dampers in each area of the plurality of areas, respectively, the small scale range being a smaller scale range than the medium scale range.

2. The system according to claim 1, wherein the optimum control value is calculated by applying the pre-processed data to the boiler combustion model to repeatedly execute a performance simulation of the boiler combustion model and by applying results of the performance simulation to a combustion optimization algorithm.

3. The system according to claim 2, wherein the combustion optimization algorithm is one of a Proportional-Integral-Derivative (PID) algorithm, a Degree of Freedom (DOF) algorithm, a Model Predictive Control (MPC) algorithm, an Adaptive algorithm, a Fuzzy algorithm, an H-infinity algorithm, a Linear Parameter Varying (LPV) Model-based algorithm, and a Genetic Algorithm (GA).

4. The system according to claim 1,
   wherein the optimum control values of the first, second, and third operations are sequentially used as reference values for a current operation of the plurality of operations and a next operation of the plurality of operations this is performed for a more specified scale range,
   wherein the first operation uses an optimum control value that is calculated by the first operation and is an average value for all dampers,
   wherein the second operation uses an optimum control value that is calculated by the second operation and is an average value for the dampers of a given area of the plurality of areas, and
   wherein the third operation uses an optimum control value calculated by the second operation.

5. The system according to claim 1, wherein the plurality of control objects are divided into groups according to each of a plurality of specified ranges of an operation of the boiler.

6. The system according to claim 1, wherein the CPU is further configured to execute program steps of:
   receiving an optimization purpose selected by a user; and
   applying a combustion optimization algorithm depending on the optimization purpose.

7. The system according to claim 6, wherein the optimization purpose includes one of a cost optimization considering a cost as a top priority, an emission optimization considering an emission reduction as a top priority, and an equipment protection optimization considering an equipment protection as a top priority.

8. The system according to claim 1,
   wherein the CPU is further configured to execute program steps of:
      selecting two or more algorithms capable of performing the combustion optimization operation from a plurality of algorithms; and
      selecting one of the two or more algorithms as a combustion optimization algorithm for performing the combustion optimization operation, and
   wherein the two or more algorithms are selected before performing the combustion optimization operation for the boiler.

9. A method of controlling a boiler having a plurality of areas, the method comprising:
   collecting information on a current operating state of the boiler to determine whether to perform a combustion optimization operation for the boiler;
   pre-processing data collected from the boiler;
   creating a boiler combustion model based on the pre-processed data;

performing the combustion optimization operation using the boiler combustion model and the pre-processed data to calculate an optimum control value for a first time period; and
controlling a plurality of control objects of the boiler by reflecting the optimum control value to a boiler control logic, the plurality of control objects including control of an amount of coal that is fed from a coal feeder to a combustion chamber of the boiler and an adjustment of a damper angle of each of a plurality of dampers installed in the boiler,
wherein each of the plurality of control objects of the boiler is controlled by:
dividing a control range of a corresponding control object of the plurality of control objects of the boiler into a plurality of continuous stage sub-ranges;
checking a current operating state of the corresponding control object prior to the controlling of the executed program steps; and
reflecting the optimum control value in the boiler control logic existing for the current operating state,
wherein the corresponding control object is controlled for each stage of the plurality of continuous stage sub-ranges and is controlled during each of a plurality of second time periods respectively corresponding to the plurality of continuous stage sub-ranges, each of the plurality of second time periods being shorter than the first time period,
wherein the plurality of dampers includes a group of dampers installed in each area of the plurality of areas of the boiler, each of the groups of dampers including a plurality of parts of damper groups, each of the plurality of parts of damper groups including at least one unit of dampers, each of the at least one unit of dampers comprising a damper that is separate from all other dampers,
wherein the optimum control value is calculated for each damper of the plurality of dampers such that the combustion optimization operation includes a plurality of operations,
wherein the combustion optimization operation is performed by a first operation of the plurality of operations, a second operation of the plurality of operations, and a third operation of the plurality of operations,
wherein the first operation of the plurality of operations is performed over a large scale range on each damper of the plurality of dampers,
wherein the second operation of the plurality of operations is performed over a medium scale range on the dampers for each area on the basis of a value calculated by the first operation, the medium scale range being a smaller scale range than the large scale range, and
wherein the third operation of the plurality of operations is performed over a small scale range on individual dampers in each area of the plurality of areas, respectively, the small scale range being a smaller scale range than the medium scale range.

10. The method according to claim 9, wherein the optimum control value is calculated by applying the pre-processed data to the boiler combustion model to repeatedly execute a performance simulation of the boiler combustion model and by applying results of the performance simulation to a combustion optimization algorithm.

11. The method according to claim 10, wherein the combustion optimization algorithm is one of a Proportional-Integral-Derivative (PID) algorithm, a Degree of Freedom (DOF) algorithm, a Model Predictive Control (MPC) algorithm, an Adaptive algorithm, a Fuzzy algorithm, an H-infinity algorithm, a Linear Parameter Varying (LPV) Model-based algorithm, and a Genetic Algorithm (GA).

12. The method according to claim 9,
wherein the optimum control values of the first, second, and third operations are sequentially used as reference values for a current operation of the plurality of operations and a next operation of the plurality of operations this is performed for a more specified scale range,
wherein the first operation uses an optimum control value that is calculated by the first operation and is an average value for all dampers,
wherein the second operation uses an optimum control value that is calculated by the second operation and is an average value for the dampers of a given area of the plurality of areas, and
wherein the third operation uses an optimum control value calculated by the second operation.

13. The method according to claim 9, wherein the plurality of control objects are divided into groups according to each of a plurality of specified ranges of an operation of the boiler.

14. The method according to claim 9, wherein the optimum control value is calculated by receiving an optimization purpose from a user and by applying a combustion optimization algorithm depending on the optimization purpose.

15. The method according to claim 14, wherein the optimization purpose includes one of a cost optimization considering a cost as a top priority, an emission optimization considering an emission reduction as a top priority, and an equipment protection optimization considering an equipment protection as a top priority.

16. The method according to claim 9, further comprising:
selecting two or more algorithms capable of performing the combustion optimization operation from a plurality of algorithms; and
selecting one of the two or more algorithms as a combustion optimization algorithm for performing the combustion optimization operation,
wherein the two or more algorithms are selected before performing the combustion optimization operation for the boiler.

17. A non-transitory computer-readable storage medium storing instructions of executing a method of controlling a boiler having a plurality of areas, the method comprising:
collecting information on a current operating state of the boiler to determine whether to perform a combustion optimization operation for the boiler;
pre-processing data collected from the boiler;
creating a boiler combustion model based on the pre-processed data;
performing the combustion optimization operation using the boiler combustion model and the pre-processed data to calculate an optimum control value for a first time period; and
controlling a plurality of control objects of the boiler by reflecting the optimum control value to a boiler control logic, the plurality of control objects including control of an amount of coal that is fed from a coal feeder to a combustion chamber of the boiler and an adjustment of a damper angle of each of a plurality of dampers installed in the boiler,
wherein each of the plurality of control objects of the boiler is controlled by:

dividing a control range of a corresponding control object of the plurality of control objects of the boiler into a plurality of continuous stage sub-ranges;

checking a current operating state of the corresponding control object prior to the controlling of the executed program steps; and reflecting the optimum control value in the boiler control logic existing for the current operating state, wherein the corresponding control object is controlled for each stage of the plurality of continuous stage sub-ranges and is controlled during each of a plurality of second time periods respectively corresponding to the plurality of continuous stage sub-ranges, each of the plurality of second time periods being shorter than the first time period, wherein the plurality of dampers includes a group of dampers installed in each area of the plurality of areas of the boiler, each of the groups of dampers including a plurality of parts of damper groups, each of the plurality of parts of damper groups including at least one unit of dampers, each of the at least one unit of dampers comprising a damper that is separate from all other dampers, wherein the optimum control value is calculated for each damper of the plurality of dampers such that the combustion optimization operation includes a plurality of operations, wherein the combustion optimization operation is performed by a first operation of the plurality of operations, a second operation of the plurality of operations, and a third operation of the plurality of operations, wherein the first operation of the plurality of operations is performed over a large scale range on each damper of the plurality of dampers, wherein the second operation of the plurality of operations is performed over a medium scale range on the dampers for each area on the basis of a value calculated by the first operation, the medium scale range being a smaller scale range than the large scale range, and wherein the third operation of the plurality of operations is performed over a small scale range on individual dampers in each area of the plurality of areas, respectively, the small scale range being a smaller scale range than the medium scale range.

18. The non-transitory computer-readable storage medium according to claim 17, wherein the optimum control values of the first, second, and third operations are sequentially used as reference values for a current operation of the plurality of operations and a next operation of the plurality of operations this is performed for a more specified scale range, wherein the first operation uses an optimum control value that is calculated by the first operation and is an average value for all dampers, wherein the second operation uses an optimum control value that is calculated by the second operation and is an average value for the dampers of a given area of the plurality of areas, and wherein the third operation uses an optimum control value calculated by the second operation.

\* \* \* \* \*